United States Patent [19]

Tofte et al.

[11] Patent Number: 4,998,058
[45] Date of Patent: Mar. 5, 1991

[54] APPARATUS INCLUDING TRANSMITTER, RECEIVER AND DISPLAY HOUSINGS FOR LOCATING CORRESPONDING POINTS ON OPPOSITE SIDES OF A STRUCTURE

[75] Inventors: Semor D. Tofte, Mankato; Jeffry M. Irish, Nicolet; Thomas K. Hiniker, N. Mankato, all of Minn.

[73] Assignee: Micro-Trak Systems, Inc., Mankato, Minn.

[21] Appl. No.: 328,430

[22] Filed: Mar. 24, 1989

[51] Int. Cl.[5] .................... G01R 19/00; G01R 33/00; G01V 3/10; G02F 1/133

[52] U.S. Cl. .................. 324/67; 324/207.17; 324/207.26; 340/759; 350/331 R

[58] Field of Search .............. 324/67, 207, 326, 329, 324/207.17, 207.22, 207.26; 340/686, 752, 758, 759, 771, 774, 784; 455/90; 350/331 R, 332, 334

[56] References Cited

U.S. PATENT DOCUMENTS

| | | | |
|---|---|---|---|
| 3,704,413 | 11/1972 | Blevins | 324/67 |
| 3,836,842 | 9/1974 | Zimmermann et al. | 324/329 X |
| 4,686,454 | 8/1987 | Pecukonis | 324/67 |
| 4,837,489 | 6/1989 | McFee | 324/67 |
| 4,853,617 | 8/1989 | Douglas et al. | 324/67 |

Primary Examiner—Gerard R. Strecker
Attorney, Agent, or Firm—Merchant, Gould, Smith, Edell, Welter & Schmidt

[57] ABSTRACT

A method and apparatus for locating two corresponding points on opposite sides of a wall, floor, or other structural component. A transmitter transmits a electromagnetic signal indicative of a first point located on one side of the component, a signal receiver on the other side of the component generates an electrical signal proportionate to the strength of the electromagnetic signal, and a display outputs a maximum reading when the signal receiver indicates a maximum electromagnetic signal. The sensitivity of the display may be adjusted. The transmitter, receiver, and display may be structurally integrated when not in use. The transmitter is attached to the first side of the structural component at the first point, the receiver is moved along a second side of the structural component, and the receiver is moved along the second side to a location indicated by a maximum display.

24 Claims, 8 Drawing Sheets

APPARATUS INCLUDING TRANSMITTER, RECEIVER AND DISPLAY HOUSINGS FOR LOCATING CORRESPONDING POINTS ON OPPOSITE SIDES OF A STRUCTURE

BACKGROUND OF THE INVENTION

The present invention relates generally to a method and apparatus for locating points, and more particularly, to a method and apparatus for locating two corresponding points on opposite sides of a wall, floor, or other structural component.

Plumbing and heating contractors, carpenters, electricians, T.V. cable installers, and other persons working on structural components such as walls and floors often have a need to locate points corresponding to each other along a selected linear path on either side of the walls or floors. For example, it is sometimes necessary to drill a hole from one side of a wall through to the other side in a manner which ensures that the hole will be in the proper location on both sides of the structural component.

Since the points often cannot be viewed simultaneously, conventional methods of locating the corresponding points on either side of the structural component involve making measurements from floors or other fixed points. However, these conventional measurement methods frequently result in substantial errors in identifying the corresponding points. These inaccuracies in conventional measuring techniques may result in misidentification of objects or restrictions on one or both sides of the surface.

SUMMARY OF THE INVENTION

The apparatus in accordance with the present invention for locating two points corresponding to points located on the opposite sides of a structural component comprises a transmitter housing for enclosing a signal transmitting means for transmitting a preselected electromagnetic signal attachable to one side of the structural component, a signal transmitting means mounted in the transmitter housing for transmitting an electromagnetic signal having a preselected frequency and indicative of a first point located on the first side of the structural component having a location at a predetermined spacial relationship to the transmitter housing, a receiver housing for enclosing a signal receiving means, a signal receiving means mounted in said receiver housing for generating an electrical signal proportionate to the strength of the electromagnetic signal received from the transmitting means at a predetermined second point located on the second side of the structural component at a predetermined spacial relationship to said receiver housing, display means for displaying a maximum reading when said electrical signal generated by said signal receiving means indicates a maximum electromagnetic signal level, such that a maximum reading is displayed at the display means when the first point and second point are located along a line substantially normal to the face of the transmitting means, and electrical interconnecting means for electrically interconnecting the signal receiving means to the display means.

DESCRIPTION OF THE PREFERRED EMBODIMENT

Figure 1:
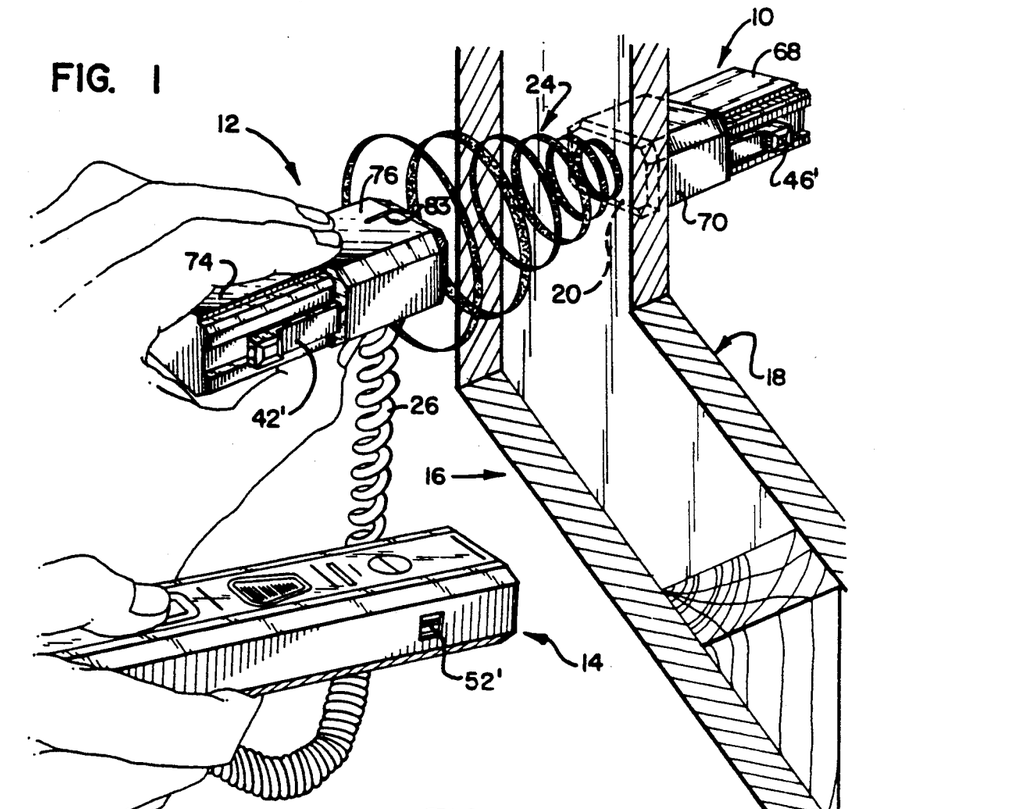
FIG. 1 shows an apparatus in accordance with the present invention including a transmitter, a receiver, and a display device as used on a structural component.

FIG. 1 shows an apparatus in accordance with the present invention as used on a structural component such as walls 16 and 18. The apparatus includes a transmitter 10, a receiver 12, and a display device or housing 14. In the preferred mode of use, the transmitter 10 includes a signal transmitting means such as a transmitter enclosed in a transmitter housing, which is placed flush to the surface of a structural component such as wall 18 by way of transmitter housing surface 20. The transmitter emits an electromagnetic signal represented by circles 24 which is received by a receiver 12 which includes a receiver mounted in a receiver housing on the opposite side of the structural component along wall 16. Receiver 12 is also placed flush against the opposite surface of the structural component in the typical mode of use. Receiver 12 is electrically interconnected with display device 14 by means of an electrical interconnecting means such as electrical cord 26. The use of electrical cord 26 allows for greater flexibility in moving the receiving housing 12 to a desired location, and allows for reading the display at a convenient angle remote from the display housing regardless of the angle required for proper use of the receiver.

Display housing 14 receives an electrical signal from receiving means 12 which is proportionate to the strength of the electromagnetic signal received from transmitter 10. The receiver 12 is moved along wall 16 to a location which indicates a maximum electromagnetic signal, typically indicating the closest location on wall 16 to transmitter 10. Such location will enable the precise location of two corresponding points on either side of walls 16 and 18, especially when the transmitting and receiving surfaces of transmitter 10 and receiver 12 are directly facing each other.

Figure 2:
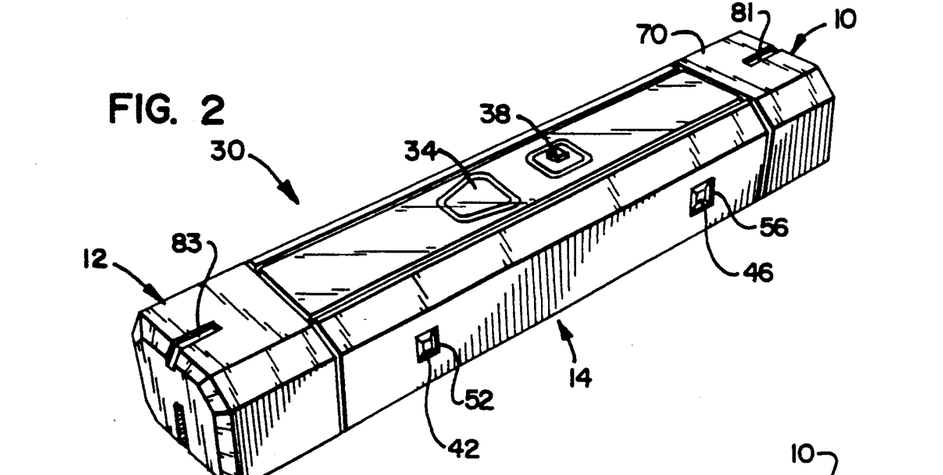
FIG. 2 is a top and front-left perspective of a precision locator apparatus in stored form in accordance with the present invention.

The external structure of an apparatus in accordance with the present invention is shown in greater detail in FIGS. 2 through 5C. FIG. 2 shows a point locator 30 in a stored position, comprising transmitter 10, display device 14, and receiver 12. Display device 14 includes a visual display 34 which, in the embodiment shown, comprises a liquid crystal display including a succession of parallel bars which increase in number as the signal received by the receiver gets stronger. Also shown in FIG. 2 is sensitivity control 38 for controlling a sensitivity adjusting means described in greater detail below. By activating this sensitivity control, ordinarily manually by the push of a button, as shown, the display 34 is reset to an output between the minimum and maximum display readings, even if the display previously indicated a minimum or maximum display. This allows more accurate location of the receiver relative to the transmitter, since the output may be repeatedly readjusted substantially independently of the distance between the transmitter and receiver. Sensitivity increases as the receiver gets closer to the transmitter. FIG. 2 also shows holes 52 and 56 formed in display housing 14 for receiving receiver retainer 42 and transmitter retainer 46.

Figures 3, 4:
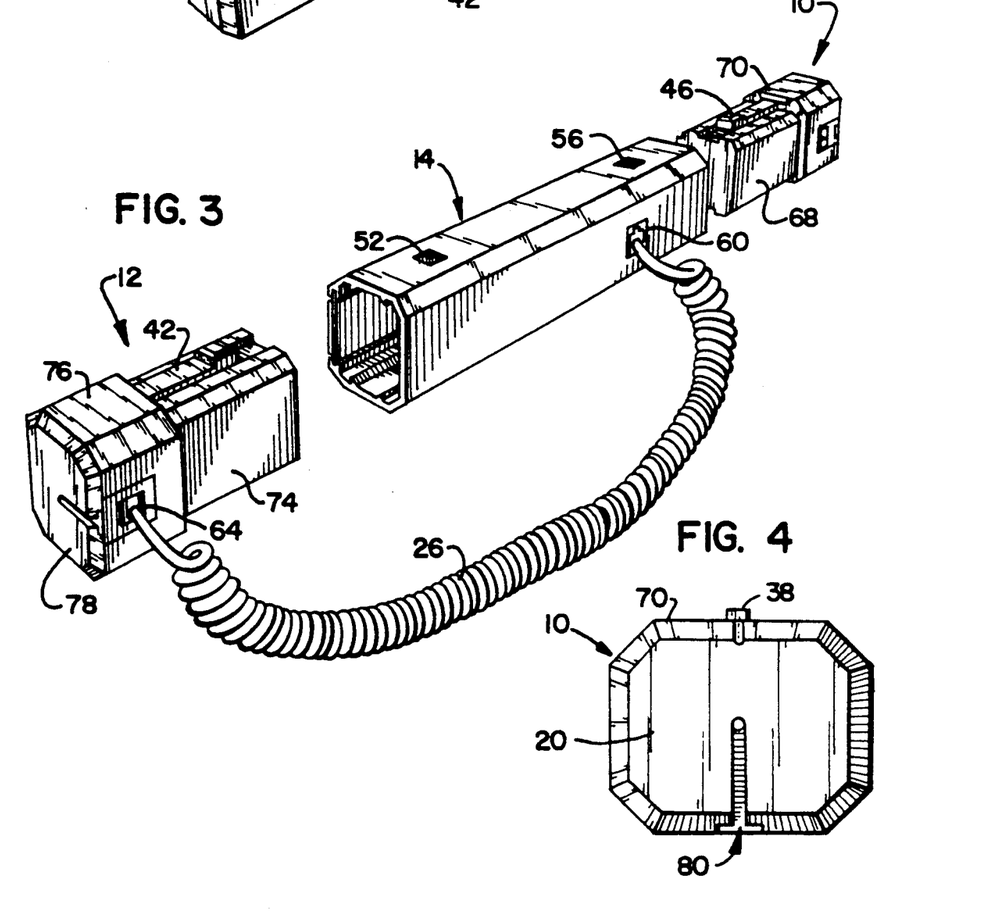
FIG. 3 is a top and left-rear exploded perspective of a precision locator apparatus detached for use in accordance with the present invention.
FIG. 4 is a bottom plan view of an apparatus in accordance with the present invention, the side opposite that shown being a mirror image thereof.

FIG. 3 shows the transmitter, receiver, and display components in accordance with the present invention in a detached form ready for use. The display means 14 forms holes 52 and 56 for receiving receiver retainer 42 and transmitter retainer 46, respectively. Electrical cord 26 is shown plugged into the display housing at display jack 60. The electrical cord 26 is plugged into the receiver at receiver jack 64. This cord provides the electrical interconnection between the receiver housing and the display housing and turns the receiver and the display on. Physically detaching the receiver from the display means while maintaining an electrical connection between the two components allows the display to be held at a convenient viewing angle regardless of the location needed for the receiver. This features also allows for easier use of the locating device in confined areas.

The transmitter 10 includes an insertable portion 68 for inserting into one hollow end of display means 14, and a base portion 70 which is slightly larger than the insertable portion and which is slid into position flush with the display device 14 when the insertable portion 68 is inserted into the display device. Receiver 12 has a structure similar to transmitter 10, including an insertable portion 74 and a base portion 76.

Figure 8A:
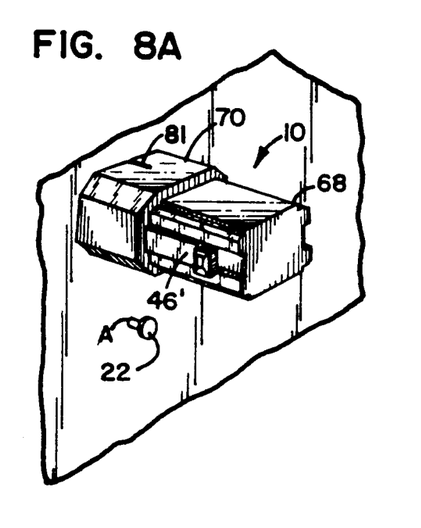
FIG. 8A is a top and rear perspective view of a transmitter to be secured in position by a nail in accordance with the present invention.
Figure 8B:
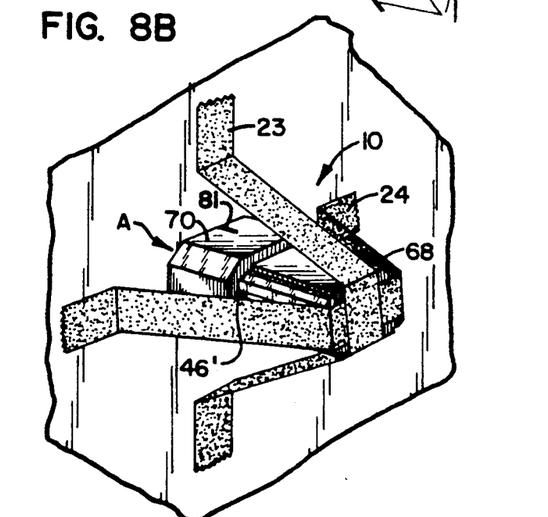
FIG. 8B is a top and rear perspective view of a transmitter taped in position in accordance with the present invention.
Figure 8C:
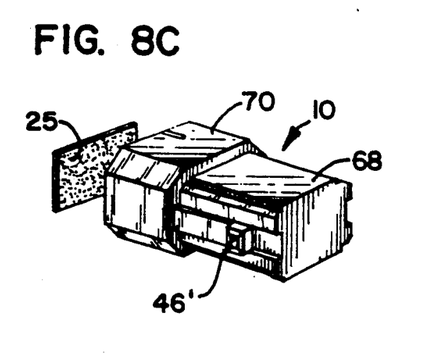
FIG. 8C is a top and rear perspective view of a transmitter to be taped, in position in accordance with the present invention.

FIG. 4 shows an end view of the base portion 70 of transmitter 10, which is identical to the base portion 76 of receiver 12. The face shown in FIG. 4 is surface 20, also shown in FIG. 1. This surface is the surface from which the electromagnetic signal is emitted by the transmitter. To enhance precise location of the transmitter on one side of the structural component, a nail receiving means such as a nail slot 80 is formed in surface 20. Transmitter 10 may be centered on a position on a structural component by inserting a small nail into the surface at the point to be located, and hanging the transmitter by slot 80 to the surface of the structural component. A transmitter slid into position over a nail as described is shown in FIG. 8A. The position of the nail when slid along slot 80 is the position closest to the electromagnetic signal in the preferred embodiment, preferably but not necessarily near the center of surface 20.

Where it is not desirable to insert a nail into a surface, such as where the surfaces of the structural component are too hard to receive nails, the planar surface 20 of transmitter 10 may be attached to a structural component by single sided tape 23, 24 or double sided tape 25, shown in FIGS. 8B and 8C, respectively. Slots such as slot 81 in FIGS. 8A and 8B provide exterior markings to the transmitter and receiver housings such that the center of the housings may be aligned when the housings are placed flush against a flat surface.

Figure 5A:
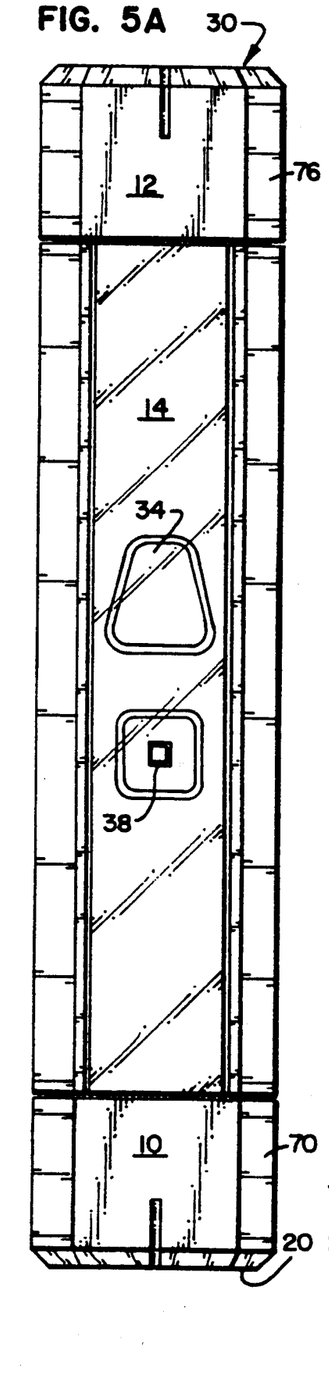
FIG. 5A is a right side elevational view of an apparatus in accordance with the present invention in stored form, the side opposite that shown being a mirror image thereof.

FIG. 5A shows components of the apparatus 30 of the present invention, including a view of a display means such as liquid crystal display 34, structurally integrated for convenient storage when not in use. Also shown is sensitivity control 38. As discussed with respect to FIG. 4, slots such as slots 80 and 87 in FIG. 5B may be used to receive a nail mounted in a wall to hold the transmitter and receiver units, respectively, to the wall.

Figure 5B:
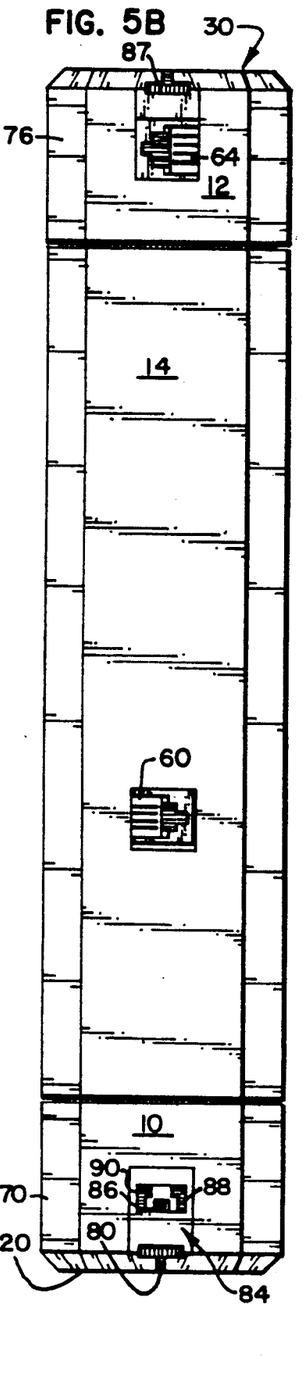
FIG. 5B is a rear elevational view thereof.
Figure 5C:
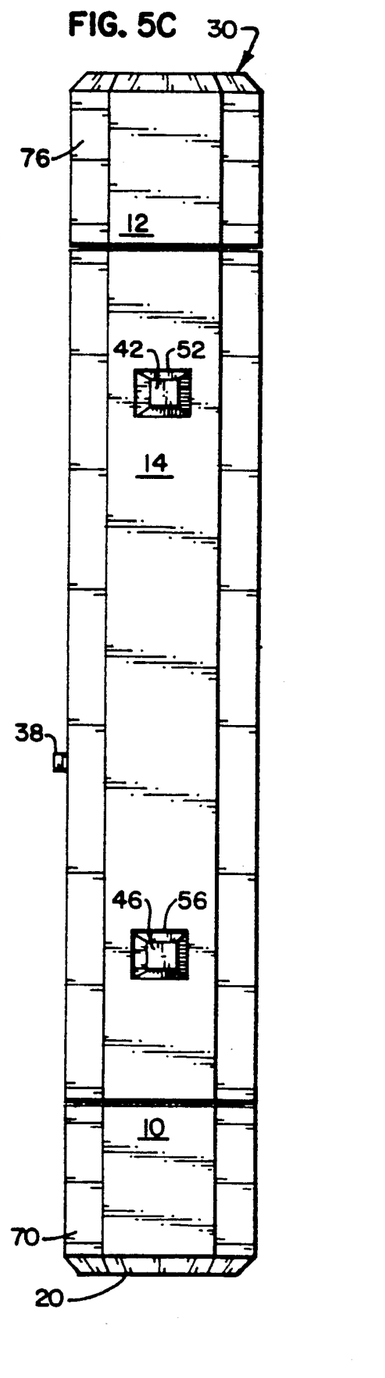
FIG. 5C is a bottom plan view thereof, the side opposite that shown being a mirror image.

FIG. 5B is yet another view of the structurally integrated component module 30 comprising transmitter housing 10, receiver housing 12, and display housing 14 in accordance with the present invention. Display housing 14 is formed by an extrusion process which results in the formation of the three sides of the display housing other than the side having LCD 34 shown in FIG. 5A. The three sides are snapped around the LCD side, which is separately fabricated. Shown is display device jack 60 without an electrical cord inserted therein, and receiver jack 64 also without an electrical cord inserted therein. Also shown is the transmitter strength control means in the form of control switch 84 of the transmitter including a central off position 86, as shown, a high or strong signal emitter position 88, and a low or weaker signal position indicator 90. This switch may be manually operated such that the transmitter produces no signal at all, a relatively weaker signal, or a relatively stronger signal for receipt by the receiver means. The stronger or weaker signal may be chosen in accordance with how thick the structural component is, or the materials composing the structural component, or to increase or decrease receiver sensitivity, among other factors. FIG. 5C shows a side view of the transmitter, receiver, and display housings joined, as previously discussed with respect to FIG. 2.

Figure 5D:
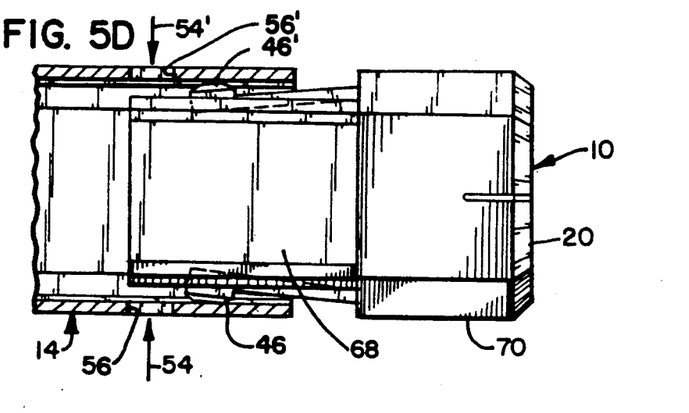
FIG. 5D is a right side elevational view of a transmitter disengaged from the display housing in accordance with the present invention.

FIG. 5D is a more detailed presentation of the means for connecting and separating transmitter 10 from display housing 14. Transmitter 10, having a connecting and separating structure similar to receiver 12, has a pair of releases indicated by 42 and 42' located on opposite sides of the transmitter. When the transmitter is stored with the display housing, the ends of retainers 42 and 42' are stored in display housing retainer receiving holes 52 and 52', respectively. To release the transmitter from the display housing, retainers 42 and 42' are depressed through retainer receiving holes 52 and 52', in the direction indicated by the arrows 54 and 54'. This releases the transmitter from the display housing and allows the insertable, narrower portion 68 of the transmitter to be slid out of the display housing. The wider base portion 70 abuts the display housing 14 when transmitter housing 10 and display housing 14 are completely integrated. Each end of display housing 14 forms a cavity, one for receiving the insertable portion 68 of the transmitter housing and the other for receiving the corresponding portion of receiver housing 12.

Figure 6:
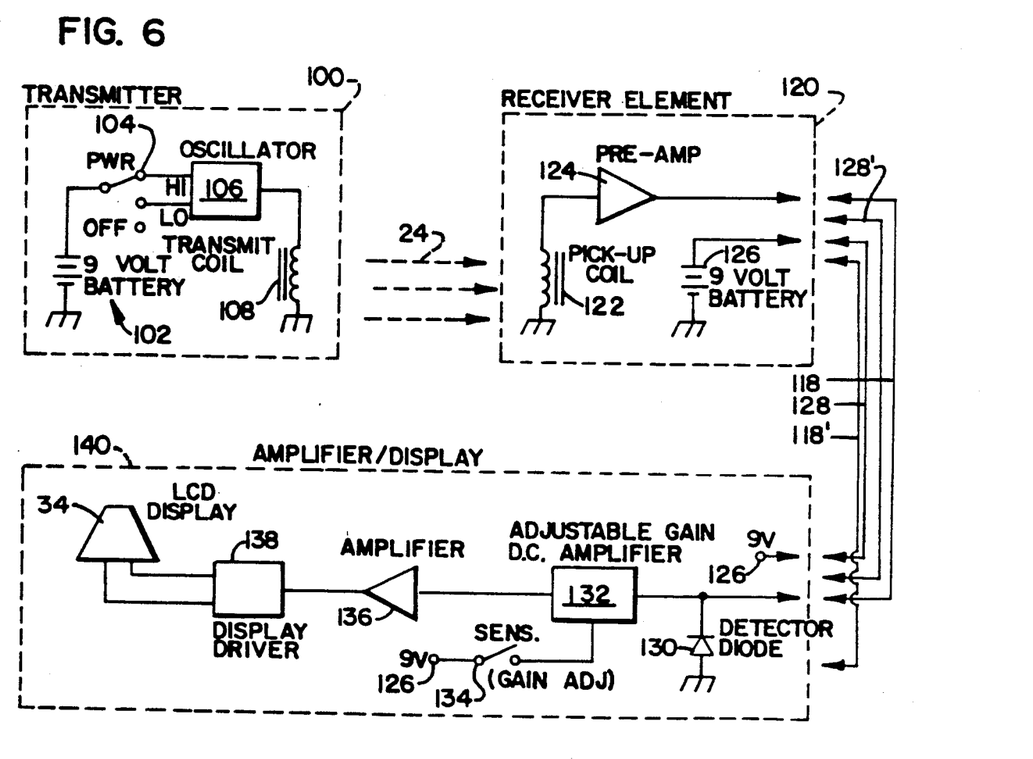
FIG. 6 is a block diagram showing the components of the transmitter, receiver, and amplifier/display circuitry in accordance with the present invention.

FIG. 6 is a block diagram of the electrical circuitry of an apparatus in accordance with the present invention including a transmitter 100, a receiver 120, and an amplifying and display circuit- 140. Transmitter 100 is powered by a nine volt battery 102 which may be replaced as needed, in a manner to be described below. The power is controlled at power switch 104, which may take a high, low, or off position as indicated in FIG. 5B at switch 84. Oscillator 106 creates an electrical signal which is converted into an electromagnetic signal of a predetermined frequency at transmit coil (transformer) 108.

The electromagnetic signal 24 is received by the receiver 120 at pick-up coil (transformer) 122. The electromagnetic signal is converted into an electrical signal and amplified by preamplifier 124. This circuitry is also powered by a nine volt battery 126. The receiver element is interconnected to the amplifier/display circuit 140 by electrical wires 128, 128', 118, and 118', which are interconnected between receiver circuit 120 and amplifier/display circuit 140 by cord 26, discussed previously. Connection of cord 26 to receiver housing 12 and display housing 14 supplies power to amplifier/display circuit 140 by way of line 128'. The interconnection and function of lines 118, 118', 128, and 128' are shown and described in more detail in FIG. 11B and accompanying text. Amplifier/display circuit 140 is powered by the same nine volt source 126 that powers the receiver element 120. The amplifier/display circuit provides a return line for this power source through line 128 to receiver circuit 120. Detector diode 130 ensures that a negative voltage potential is not provided across adjustable gain DC amplifier 132. The electrical signal received from receiver element 120 is amplified at adjustable gain DC amplifier 132. This amplification may be adjusted by sensitivity control 134, corresponding to control 38 in FIG. 5A. Successive activations of the sensitivity switch 134 successively adjust the gain provided by the DC amplifier 132 such that the reading at liquid crystal display(LCD) 34 is between the minimum and maximum readings, and preferably at a middle-range reading. The signal is further amplified by amplifier 136 and converted into a signal readable at the liquid crystal display 34 by means of the display driver circuit 138.

A method of locating two corresponding points on either side of a structural component will now be described in greater detail. The device, shown in stored form in FIG. 2, is separated into components for use as described in connection with FIG. 5D. By applying pressure to the retainers, the receiver 12 and transmitter 10 are loosened from the display housing 14 such that they may be easily slipped out of the housing as shown in FIG. 5D. Once the components are separated and cord 26 is inserted into jacks 60 and 64, the apparatus takes the form shown in FIG. 3. Plugging the cord 26 into receiver jack 64 automatically turns the receiver and display circuits on.

Switch 84 of transmitter 10 is then activated to generate an electromagnetic signal. The high output position is normally used for structural thicknesses ranging from 12 to 36 inches. The low output position is used for structural component thicknesses of 3 to 12 inches, and allows for the greatest alignment accuracy. The high setting may, however, provide quicker general location for any thickness.

Before using the apparatus with a structural component, the device should be tested and adjusted. This is done by setting the transmitter to its low setting and placing it on a flat surface. The receiver should be held at a position remote from the transmitter, and the display viewed. This initial step should be done with the transmitter and receiver located a few feet from each other. The sensitivity switch should then be pressed and released to obtain the initial sensitivity range. The face of the receiver, corresponding to surface 78 shown in FIG. 3, should be moved towards the face 20 of transmitter 10. The display means 34 will indicate an increasingly strong signal. When the display means indicates a maximum signal, the receiver should be held in position as the sensitivity switch 38 is activated. Pressing the sensitivity switch resets the display readout to a lower level which remains proportionate to the electromagnetic signal strength received at the receiver, and limits the apparatus's range to shorter distances. However, sensitivity within that shorter distance range increases for greater accuracy.

Figure 7:
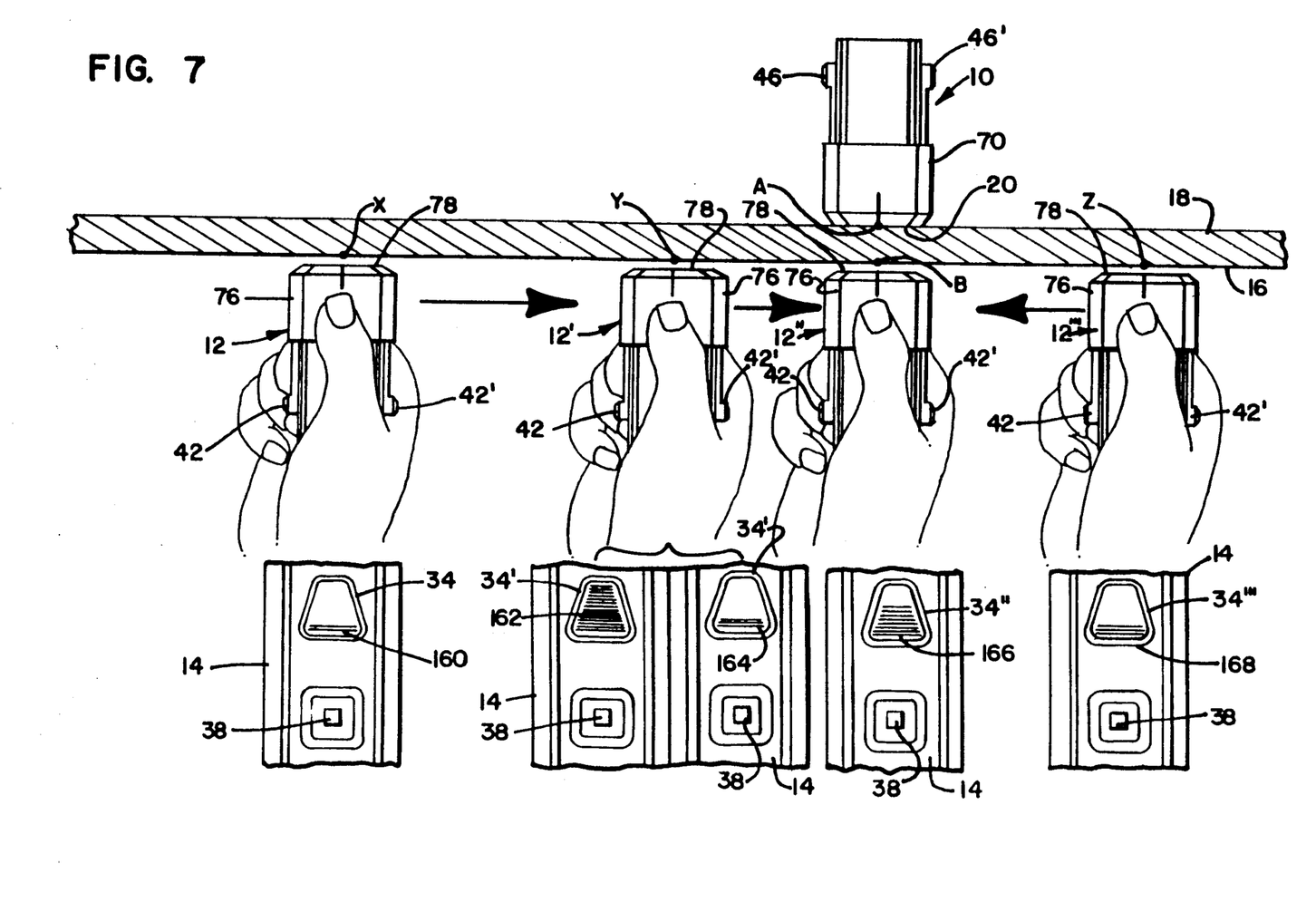
FIG. 7 is a diagram showing a method of locating two points on opposite sides of a structural component in accordance with the present invention.

FIG. 7 shows an apparatus in accordance with the present invention as used step-by-step to indicate the desired locations. The transmitting surface 20 of transmitter 10 is centered over first location A located on the side of surface 18 opposite the surface 16. Typically, surface 18 is a flat surface and the corresponding point B will be located on the opposite side of wall 16 from wall 18 along a line from point A perpendicular to the surface of wall 18. However, it should be clear to one skilled in the art that the method and apparatus described herein may be used to align points A and B which are not perpendicular to each other. Surfaces 16 and 18 may comprise portions of other structural components such as a floor. Transmitter 10 is set to either the LOW or HIGH setting, depending on the structural thickness and accuracy desired.

Receiver 12 having a signal receiving surface 78 is shown in FIG. 7 in successive locations including locations centered over points X, Y, B, and Z leading to a final location corresponding to desired point B. Once the display readout 34 is calibrated, it will have a relatively low reading, represented by display reading 160, when transmitter 12 is centered over location X on wall 16. Transmitter 12 is then moved along wall 16 in a direction corresponding to a stronger electromagnetic signal output at display 34. In FIG. 7, this is represented by the receiver 12 located over point Y. When receiver 12 is moved in the direction closer to desired point B, represented by receiver 12', the signal reading displayed in display readout 34 will increase in strength. Should the sensitivity of display readout 34' be set too high, the reading at point Y may be a maximum reading, as shown in display 162, even though the receiver is not yet centered over optimum point B. Thus, should the maximum readout appear as in display readout 162, sensitivity control 38 should be depressed to obtain a lower reading for the same point, as indicated by display readout 164 for point Y. The receiver 12' is then again moved in a direction indicating a stronger signal, in FIG. 7 from point Y to desired point B. When receiver 12" is centered over location B, the readout displayed in display 34" may take the form as shown in display 166, indicating a stronger signal then that shown in display 164 for point Y (after sensitivity is adjusted) but a signal below the maximum level which may be displayed by the display readout.

As receiver 12", is moved past optimum point B to location Z, the electromagnetic signal from transmitter 10 will again weaken and the display readout 168 will indicate a lower signal than that indicated by display 166 for point B. This lower display readout indicates that the receiver 12'" has gone past optimum point B and should be moved back from point Z to point B. By this method, the receiver 12 may provide an indication of point B within an accuracy of as little as 0.25 inch.

Figure 9:
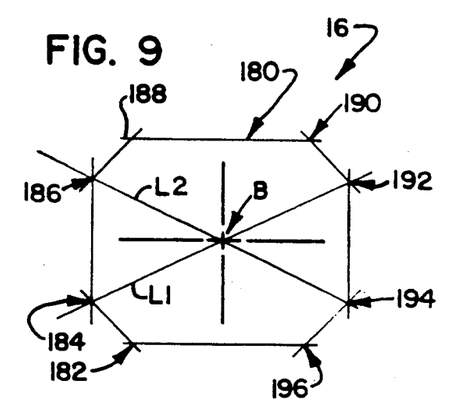
FIG. 9 is a diagram including a tracing around a receiver housing(not shown) for showing a method of locating a point in accordance with the present invention.

Once the receiver 12" is centered over location B, the point may be marked for reference by the user. A simple means of locating point B is shown in FIG. 9. FIG. 9 shows an outline 180 drawn around the periphery of receiving face 78 of receiver 12. Face 78 is structurally integrated with the receiver housing 12, formed in the periphery thereof, and may be identical to the shape of the transmitting surface 20 shown in FIG. 4. Once the tracing 180 is completed, receiver 12 may be removed from surface 16. The tracing 180 has a number of sides which are consecutively joined at connecting points 182, 184, 186, 188, 190, 192, 194, and 196. The receiving surface 78 of receiver 12 is designed such that lines drawn between at least two appropriate pairs of these points will intersect the center of the receiving surface, corresponding to point B in FIG. 7. For example, lines drawn from point 184 to point 192, and point 186 to 194, as shown at L1 and L2, will intersect at point B. Corresponding connecting points may be labeled, but it will be evident to one skilled in the use of the apparatus which points correspond to each other. In this manner, point B may be located with substantial precision. It should be obvious to one skilled in the art that various other shapes of receiver surface 78 may be used which would generate a different shape for tracing 180 but which would still indicate location B with substantial precision in a manner similar to that described herein.

Figure 10:
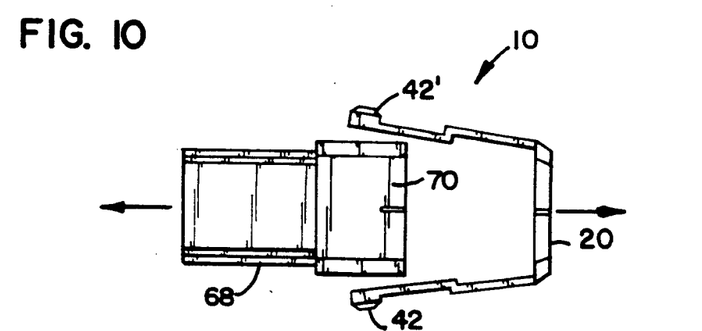
FIG. 10 is a side elevational view of a separated transmitter housing in accordance with the present invention.

FIG. 10 shows how the transmitter 10 may be opened in order to insert or change the battery for the transmitter. Receiver 12 has a similar construction. Retainers 42 and 42' may be pulled away from the narrow portion 68 of receiver 10. Such movement of retainers 42 and 42, results in releasing the base portion 70 of transmitter 10 from the narrow portion 68, exposing the inside of the transmitter where the battery is located.

Figure 11A:
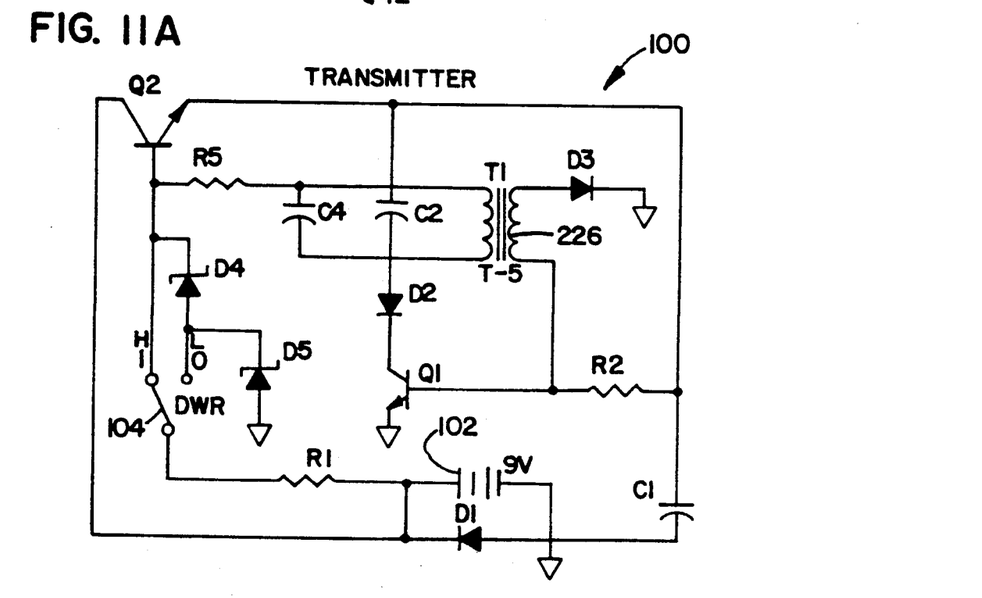
FIGS. 11A and 11B are schematic diagrams of the transmitter, receiver, and amplifier/display circuits of the present invention.
Figures 11B, 13:
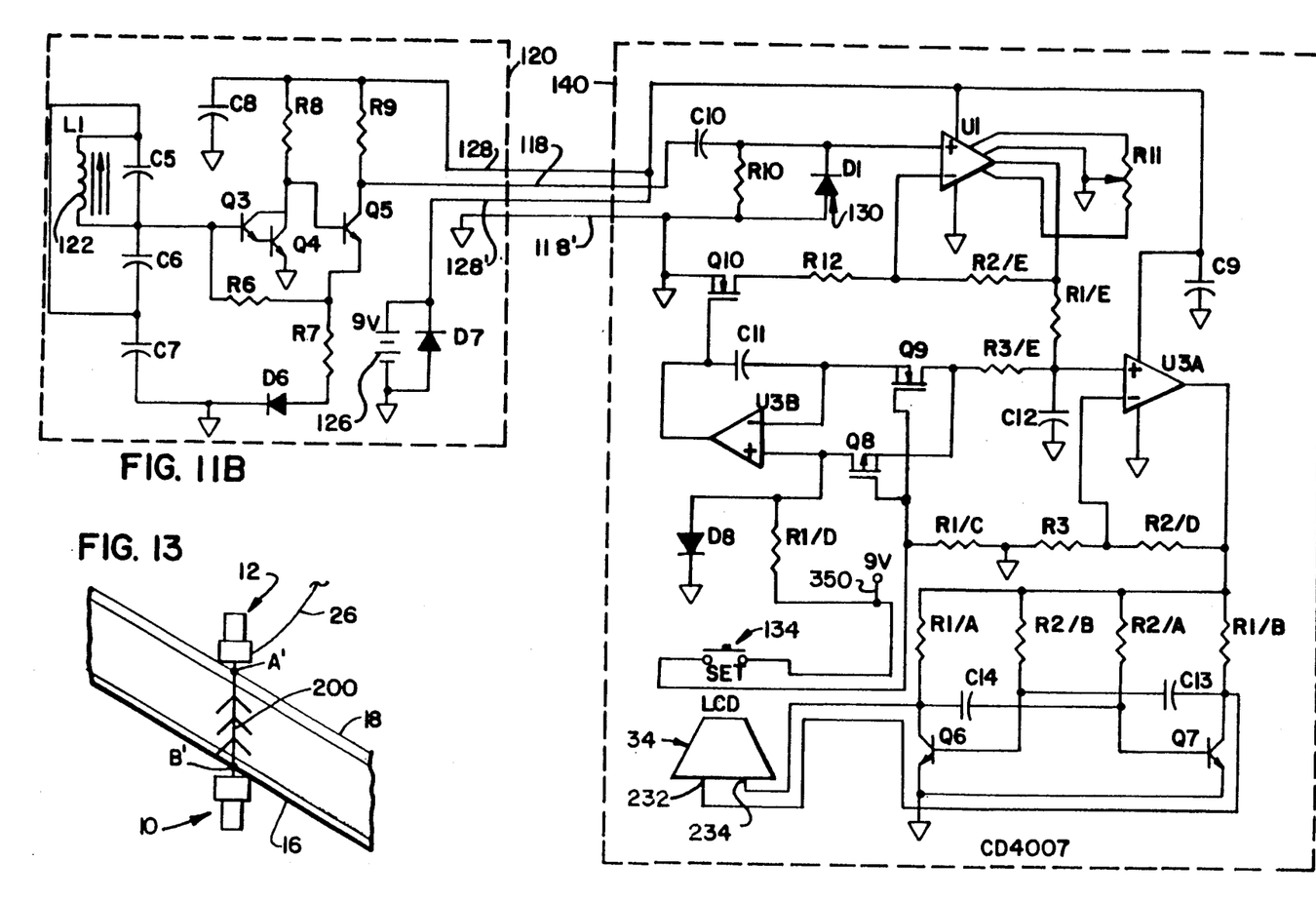
FIG. 13 is a diagram of a variation on a method of locating two points on opposite sides of a structural component in accordance with the present invention.

FIGS. 11A and 11B are schematic drawings of the transmitter, receiver, and amplifier/display circuitry shown more generally in FIG. 6. Transmitter 100, shown in FIG. 11A, includes 9 volt source 102. Diode D1 provides reverse-polarity protection, for example, from incorrectly connecting the battery. The power source feeds through resistor R1 to power switch 104, previously described.

The HIGH and LOW settings of power switch 104 are regulated by two zener diodes D4 and D5. D4 may have a reverse-bias voltage of 2.4 V and a forward-bias voltage of 0.6 V, and D5 may have a reverse-bias voltage of 3.3 V. At the HI power setting, both D4 and D5 are reverse biased and the power output is 2.4 V plus 3.3 V or 5.7 V. At the LO power setting, D4 is forward-biased and D5 is reverse-biased. The voltage potential at the forward end of D4 is 3.3 V minus 0.6 V, or 2.7 V. The output of switch 104 regulates the base of transistor Q2.

Power source 102 also feeds the collector of transistor Q2. Transistor Q2, in conjunction with resistor R5, capacitors C1, C2, and C4, diode D2, and transistor Q1, produce an oscillating signal emitted by transmitter coil (transformer) 226. Resistor R2 and forward-biased diode D3 provide a sufficient forward-biasing voltage to transistor Q1 to maintain the transistor in its amplification mode. A typical operating frequency that may be selected for the transmitter circuit is 7.932 KHz.

The signal emitted by the transmitter 100 is received at receiver 120 through pickup coil (transformer) 122, shown in FIG. 11B. Capacitors C5 and C6, in tandem with pick-up coil L1, have capacitances selected for receipt of electromagnetic signals of the frequency generated by the transmitter. Capacitor C7 decouples coil (transformer) L1 from ground to prevent short-circuits.

The signal generated by coil L1 is amplified by the circuit comprising the nine-volt battery source 126 protected from reverse polarity by diode D7, capacitor C8, and transistors Q3, Q4, and Q5. Resistors R8 and R9 provide loads for the collectors of Darlington-pair transistors Q3 and Q4. Resistor R7 and diode D6 provide series shunt feedback which elevates the emitter-ground voltage of transistor Q5 to approximately 1.2 V, assuring that an adequate bias point is maintained for the base of transistor Q3 through resistor R6.

Line 128' from receiver 120 supplies the 9 volt battery source 126 to the amplifier/display circuit 140. Line 128 returns to the receiver circuit 120 to power the signal amplifier. Line 118 provides a preamplified signal from receiver 120 to amplifier/display circuit 140. Line 118' is a ground for the receiver and amplifier/display circuits.

FIG. 11B also shows the circuitry of the amplifier/display circuit 140, shown in block form in FIG. 6. The 9 volt source 126 supplies amplifier U1, filtered by capacitor C9. The signal inputted from the receiver along line 118 is fed through capacitor C10. Diode 130, connected in series with resistor R10, protects amplifier U1 from negative voltages. The signal is then provided to amplifier U1. Offset voltage adjustment is provided by variable resistor R11, allowing the output of amplifier U1 as supplied to resistors R1/E and R2/E to be factory preset as desired.

The 9 volt power source 350 (corresponding to power source 126) powers the sensitivity switch 134 (38 in FIG. 2). Activation of this sensitivity switch 134 supplies transistor Q9 with sufficient voltage to place the transistor in a full "on" state. Transistor Q8 is turned off. Resistor R1/C provides a shunt path for the voltage supplied to Q8 and Q9. Voltage is supplied through resistor R1/D to the positive input of amplifier U3B, limited to approximately 0.6 V by diode D8, which is forward biased. When the switch 134 is activated, the amplifier will regulate itself such that the negative input to amplifier U3B will be driven to a voltage equal to the positive input of amplifier U3B. This regulation results primarily from self-adjusting of the current through transistor Q10. Transistor Q10 controls the current through resistor R12, which feeds the negative input to U1. The voltage at the negative input to U1 is adjusted higher or lower to adjust the output of U1 to R1/E and R2/E such that the current through R1/E, R3/E, and Q9 produces a steady-state voltage input to U3B of about 0.6 V. This process results in a calibration of the positive input to amplifier U3A to a preset value. When switch 134 is deactivated, capacitor C11 is charged and transistor Q8 is turned off such that the voltage levels at the negative input of U3B and the positive input of U3A are maintained at these values. A 0.6 V potential is supplied to the connection between Q9 and R3/E by transistor Q8 when switch 134 is off, reducing the leakage at capacitor C11.

Adjustment of the positive input of U3A readjusts the voltage supplied to LCD display 34 such that the displayed output is between the minimum and maximum outputs, for example about five "bars" on a fourteen-"bar" display. Despite this readjustment, the input to the LCD display remains proportionate to the input to amplifier U1, and thus to the strength of the electromagnetic signal received by the receiver.

The output of amplifier U3A is fed to an a stable multivibrator circuit including two parallel resistor-transistor circuits, resistors R1/A, R1/B, R2/A, and R2/B and transistors Q6 and Q7. This circuit generates an oscillating signal having a substantially square wave form when capacitor C13, resistor R1/B, and resistor R2/B have values substantially equal to corresponding elements C14, R1/A, and R2/A, respectively. The circuit also minimizes the effective DC voltage applied across the inputs to LCD display 34.

With a nine-volt source supplying the circuitry, the output from the multivibrator has an effective potential difference from minimum to maximum of approximately 18 V. This difference enhances the performance of the LCD display, described in further detail below. The a stable multivibrator, or square wave oscillator, also provides an accurate low-voltage output for powering LCD 34 at voltages in the range of one volt or less. Capacitors C13 and C14 are selected to obtain the desired frequency of the multivibrator square wave.

Figure 12A:
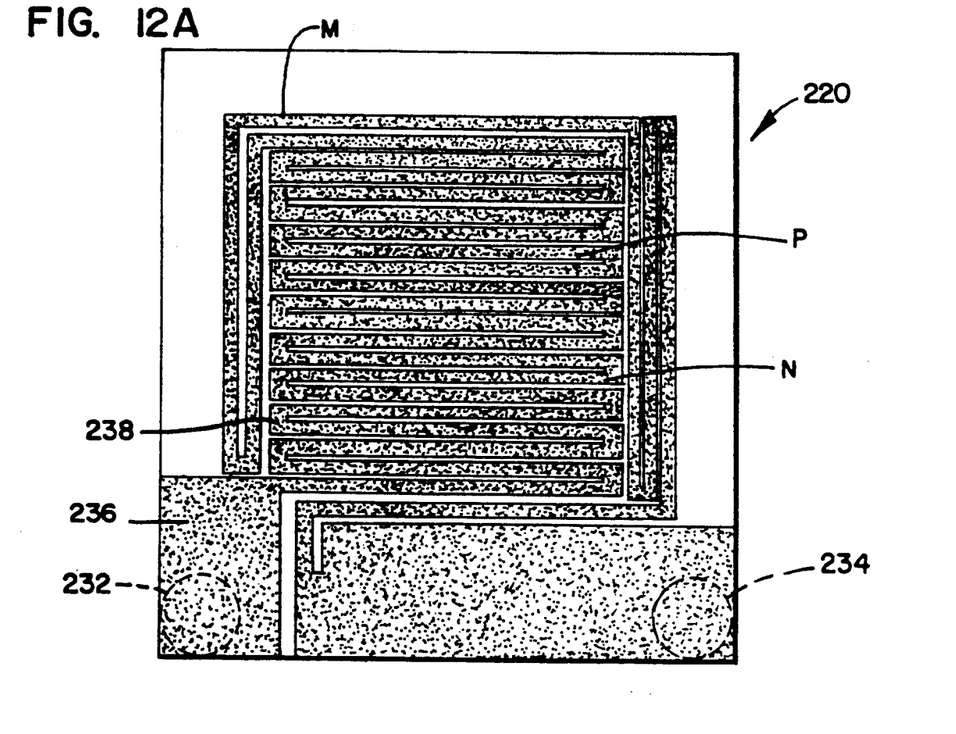
FIGS. 12A and 12B are top views of the liquid crystal display element and cover thereof in accordance with the present invention.
Figure 12B:
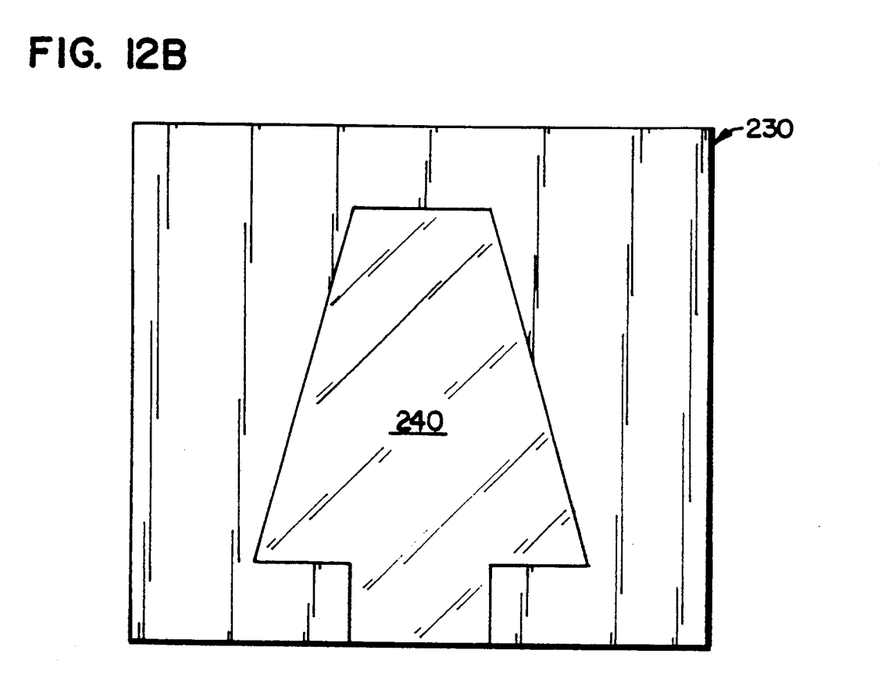

FIGS. 12A and 12B show the elements of the liquid crystal display 34 including transparent conductive element 238 on a first glass element 220 and transparent conductive element 240 on LCD glass backplane 230. Element 220 is comprised of resistive element 238 having a constant ohms-per square throughout. The display uses standard LCD materials including a low operating voltage fluid, an elastomeric connector, smooth reflective backing, and polarizers. The resistive element is connected across pins 232 and 234, received from the display driver circuit as indicated in FIG. 11B. Although the display indicates a range of values corresponding to the strength of the electromagnetic signal received at the receiver, only two inputs to the element are needed.

The resistive LCD element 238 winds in a series of linear segments from pin 232 to point M, as shown in FIG. 12A. In the preferred embodiment, about 440 squares (corresponding to 44 KOhms resistance at 100 Ohms/square) connect pin 232 to point M. About 176 squares connect point M to pin 234 (comprising about 17.6 KOhms at 100 ohms/square). However, the metalization process may create a resistive element having other resistances per square which are equally appropriate for the circuit, since the resistance per square will be substantially constant throughout the resistive element. The element 238 path from point M to pin 234 comprises multiple segments connected at right angles to each other in the embodiment shown. The path from pin 232 to point M includes about 39 linear segments connected at right angles in the embodiment shown. The 39 segments include about 20 longer, horizontal segments, which correspond to the bars at display 34. The remainder of the segments are short, vertical segments which bridge the horizontal segments but are not part of the active area defined by element 240.

A varying-amplitude square wave is fed from the oscillating circuit shown in FIG. 11B and previously described to pins 232 and 234. As the voltage across pins 232 and 234 increases, indicative of a stronger electromagnetic signal received at the receiver, the successive resistive squares of resistive element 238 will have higher potentials in a direction from pin 232 to point M. For example, a voltage potential across pins 232 and 234 of 10 volts will have a voltage difference from pin 232 to point A of $44K*10V/(44K+17.6K)=7.14$ V. Since there are 440 squares from pin 232 to point M in the embodiment shown by way of example, each square from pin 232 to point M will have a voltage potential which increases by $7.14 V*100/44 K$, or about 0.016 V. When a particular square has a voltage potential greater than a threshold voltage for the LCD element, the LCD metal traces are activated and the display darkened at the location of that square. One skilled in the art will recognize that there is a border area around the threshold voltage where the metal traces partially but not fully react to the potential difference. Increasing the potential across pins 232 and 234 will result in a greater number of squares at or above the threshold voltage. Thus, the portion of the resistive element 238 that is at a voltage which activates the liquid crystal display may increase from the segment between pin 232 and point N in FIG. 12A, to the segment extending from pin 232 to point P in FIG. 12A.

FIG. 12B shows display backplane 230, which is placed over display element 220 to present a display to the user such as the displays shown in FIG. 7 at 162, 164, 166, and 168. A relatively low voltage across pins 232 and 234 will activate only the first portion of the resistive element 238 from pin 232 to point M, corresponding to an appearance of a relatively small number of "bars" in the display screen, such as shown at display 160 or 164 in FIG. 7. As the voltage between pins 232 and 234 ( and thus pin 232 and point M) increases, the number of "bars" which appear in the display increases in the upward direction, such as shown at display 166 in FIG. 7. A maximum reading will appear as a series of several bars substantially filling the trapezoidal portion of cover 230, as indicated by display 162 of FIG. 7.

FIG. 13 shows the location of transmitter 10 and receiver 12 where the points to be located correspond to points A' and B'. A line drawn from A' to B' is not perpendicular to surfaces 18 and 16, unlike the situation as shown in FIG. 7. Thus, for optimum performance transmitter 10 and receiver 12 are held such that transmitting surface 20 and receiving surface 78 are normal to the linear path 200 between A' and B', rather than flush with surfaces 18 and 16, respectively, in order to achieve the best results. Otherwise, the process used is similar to the process described herein.

The values or product numbers of the elements described in FIGS. 11A and 11B are set forth in Table A.

TABLE A

| COMPONENT | VALUE/PRODUCT NUMBER |
|---|---|
| R1, R2, R9 | 1.1 K Ohms |
| R3 | 62 K Ohms |
| R5, R8 | 20 K Ohms |
| R6 | 270 K Ohms |
| R7 | 150 Ohms |
| R10 | 2.7 K Ohms |
| R11 | 25 K Ohms (variable) |
| R12 | 100 Ohms |
| R1/A, R1/B, R1/C, R1/D | 10 K Ohms |
| R2/A, R2/B, R2/D, R2/E | 220 K Ohms |
| L1 | 33 mH |
| D1, D2, D5 | 1N4005 |
| D3, D6, D8 | 1N4148 |
| D4 | 1N5221B (zener) |
| D5 | 1N5229B (zener) |
| Diode 130 | 1N34A |
| Q1, Q2, Q5, Q6, Q7 | 2N4401 |
| Q3, Q4 | MPSA13 |
| Q8, Q9, Q10 | 2N4007 |
| C1 | 6.8 micro F |
| C2 | .027 micro F |
| C4 | 22 micro F |
| C5 | 2200 pico F |
| C6, C10, C13, C14 | .01 micro F |
| C7 | .001 micro F |
| C9 | 47 micro F |
| C11, C12 | .1 micro F |
| U1 | TLC271 |
| U3A, U3B | TLC272 |

What is claimed is:

1. An apparatus for locating two points corresponding to points located on the opposite sides of a structural component comprising:
   (a) a transmitter housing attachable to one side of the structural component for enclosing a signal transmitting means for transmitting an electromagnetic signal;
   (b) a signal transmitting means mounted in said housing for transmitting an electromagnetic signal having a preselected frequency up to 10 KHz and indicative of a first point located on the first side of the structural component at a predetermined spacial relationship to said transmitter housing;
   (c) a receiver housing for enclosing a signal receiving means;
   (d) a signal receiving means mounted in said receiver housing for generating an electrical signal proportionate to the strength of the electromagnetic signal received from the transmitting means at a receiver-corresponding position located at a predetermined spacial relationship to the receiver housing which corresponds to a position located on the second side of the structural component;
   (e) a display housing for enclosing a display means;
   (f) a display means for displaying a maximum-indicative reading when said electrical signal generated by said signal receiving means indicates a maximum electromagnetic signal level, such that said maximum-indicative reading is displayed at said display means when the receiver housing is located such that the receiver-corresponding location corresponds to the second point to be located;
   (g) electrical interconnecting means for electrically interconnecting the electrical signal generated by the signal receiving means to the display means; and
   (h) sensitivity adjusting means mounted on said display housing comprising a push button control and electrically interconnected to the display means for adjusting the readout at the display means to a value between the minimum and maximum values indicated by the display means when the push button control is activated.

2. An apparatus in accordance with claim 1 comprising location indicating means formed in the periphery of an exterior surface of the receiver housing through which the receiving means receives the electromagnetic signal from the transmitting means for indicating the location along said planar surface wherein said electromagnetic signal is received for indicating the receiver-corresponding position.

3. An apparatus in accordance with claim 2 wherein the means formed in the periphery of the exterior surface further comprises two pairs of intersecting point indicating means formed in said exterior periphery, each pair located such that a line drawn between one pair will intersect a line drawn between the other pair at the receiver-corresponding position.

4. An apparatus in accordance with claim 1 wherein the electrical interconnecting means comprises an electrical cord connected between the receiver housing and the display housing such that the receiver housing is capable of being located in a position remote from the display housing.

5. An apparatus in accordance with claim 4 further comprising integrating means for detachably retaining the transmitter housing, the receiver housing, and the display housing when the apparatus is not in use.

6. An apparatus for locating two points corresponding to points located on the opposite sides of a structural component comprising:
   (a) a transmitter housing attachable to one side of the structural component for enclosing a signal transmitting means for transmitting an electromagnetic signal and including an insertable portion for retainably inserting said housing into one end of a display housing;
   (b) a signal transmitting means mounted in said housing for transmitting an electromagnetic signal having a preselected frequency and indicative of a first point located on the first side of the structural component at a predetermined spacial relationship to said transmitter housing;
   (c) a receiver housing for enclosing a signal receiving means;
   (d) a signal receiving means mounted in said receiver housing for generating an electrical signal proportionate to the strength of the electromagnetic signal received from the transmitting means at a receiver-corresponding position located at a predetermined spacial relationship to the receiver housing which corresponds to a position located on the second side of the structural component;
   (e) display means for displaying a maximum-indicative reading when said electrical signal generated by said signal receiving means indicates a maximum electromagnetic signal level, such that said maximum-indicative reading is displayed at said display means when the receiver housing is located such that the receiver-corresponding location corresponds to the second point to be located; and
   (f) electrical interconnecting means for electrically interconnecting the signal receiving means to the display means, and including an electrical cord connected between the receiver housing and the display housing such that the receiver housing is capable of being located in a position remote from the display housing;

(g) a display housing for enclosing the display means forming structural receiving means for receiving the insertable portion of said transmitter housing.

7. An apparatus in accordance with claim 6 further comprising retaining means mounted on the exterior of said transmitter housing, wherein the structural receiving means of the display housing further comprises transmitter housing receiving means formed at one end of the display housing for receiving said transmitter housing retaining means at said end of said display housing.

8. An apparatus in accordance with claim 7 wherein the receiver housing further comprises an insertable portion for retainably inserting said housing into one end of the display housing, wherein the display housing forms structural receiving means for receiving said insertable portion of said receiver housing at the end opposite the end forming a structural receiving means for the transmitter housing.

9. An apparatus in accordance with claim 8 further comprising retaining means mounted on the exterior of said receiver housing, wherein the structural receiving means of the display housing further comprises means formed at the end of the display housing opposite the transmitter housing receiving means for receiving said receiver housing retaining means.

10. An apparatus in accordance with claim 6 further comprising battery storage means mounted in said transmitter housing for storing a battery such that a battery may be inserted into said transmitter housing when said transmitter housing is separated into said insertable portion and said base portion to expose said battery storage means.

11. An apparatus in accordance with claim 10 wherein the retaining means comprises arm members mounted on said transmitter housing for inserting into the display housing; and arm member receiving cavities formed in said display housing for receiving said arm members; wherein separation of said arm members from said transmitter housing separates said insertable portion of said transmitter housing from said base portion of said transmitter housing.

12. An apparatus in accordance with claim 1 further comprising nail receiving means formed in the transmitter housing for receiving a nail inserted in said first side of the structural component at said first point at a location adjacent the transmitter housing corresponding to the area from which the electromagnetic signal is emitted from the transmitting means.

13. An apparatus in accordance with claim 1 further comprising transmitter strength control means for setting the electromagnetic signal emitted by the transmitting means at one of a selected group of signal strengths.

14. An apparatus in accordance with claim 13 wherein the transmitter strength control means comprises a pair of zener diodes electrically interconnected in parallel to a switching means connected to a power source and having a high state and a low state such that the switching means provides a high state output at a voltage substantially equal to the sum of the reverse-bias voltages of the pair of zener diodes, and a low state output at a voltage substantially equal to the sum of the forward-bias voltage of one zener diode and the reverse-bias voltage of the other zener diode.

15. An apparatus in accordance with claim 1 wherein the transmitting means comprises a power source remote from the display housing and receiver housing; an oscillator powered by said power source for supplying an electrical signal to a transmit coil for generating an electromagnetic signal, and a transmit coil electrically connected to said oscillator for producing an electromagnetic signal at a predetermined frequency.

16. An apparatus in accordance with claim 1 wherein the receiver means further comprises a pick-up coil for receiving an electromagnetic signal and converting the signal into an electrical signal; and amplifying means electrically connected to said pick-up coil for amplifying the electrical signal generated at the pick-up coil.

17. An apparatus in accordance with claim 16 wherein the sensitivity adjusting means further comprises gain setting means electrically connected to said amplifying means for setting the electrical signal amplification at said amplifying means.

18. An apparatus in accordance with claim 1 wherein the display means comprises a liquid crystal display.

19. An apparatus for locating two points corresponding to points located on the opposite sides of a structural component comprising:
(a) a transmitter housing attachable to one side of the structural component for enclosing a signal transmitting means for transmitting an electromagnetic signal;
(b) a signal transmitting means mounted in said housing for transmitting an electromagnetic signal having a preselected frequency and indicative of a first point located on the first side of the structural component at a predetermined spacial relationship to said transmitter housing;
(c) a receiver housing for enclosing a signal receiving means;
(d) a signal receiving means mounted in said receiver housing for generating an electrical signal proportionate to the strength of the electromagnetic signal received from the transmitting means at a receiver-corresponding position located at a predetermined spacial relationship to the receiver housing which corresponds to a position located on the second side of the structural component;
(e) display means for displaying a maximum-indicative reading when said electrical signal generated by said signal receiving means indicates a maximum electromagnetic signal level, such that said maximum-indicative reading is displayed at said display means when the receiver housing is located such that the receiver-corresponding location corresponds to the second point to be located, comprising
  (i) a pair of display inputs having a voltage potential proportionate to the strength of the electromagnetic signal; and
  (ii) a resistive element connected across the pair of display inputs, the resistive element forming a first set of element segments substantially parallel to each other, each element segment connected at one end to one adjacent element segment and at the other end to a second adjacent element segment by a second set of element segments positioned substantially perpendicular to said first set of element segments; and
(f) electrical interconnecting means for electrically interconnecting the signal receiving means to the display means.

20. An apparatus in accordance with claim 19 wherein the signal receiving means further comprises oscillating means for providing said pair of display inputs with a substantially square oscillating signal having an amplitude proportionate to said electrical signal.

21. An apparatus in accordance with claim 20 wherein the oscillating means comprises an astable multivibrator.

22. An apparatus in accordance with claim 19 wherein said first set of element segments comprises relatively long, linear elements and said second pair of element segments comprises relatively short, linear segments.

23. An apparatus in accordance with claim 22 wherein the display means further comprises a display cover forming a trapezoidal window and substantially covering said second set of element segments such that said first set of element segments appears through said window in the form of a series of substantially parallel, unconnected segments.

24. An apparatus for locating two points corresponding to points located on the opposite sides of a structural component comprising:

(a) a transmitter housing attachable to one side of the structural component for enclosing a signal transmitting means for transmitting an electromagnetic signal;

(b) a signal transmitting means mounted in said housing for transmitting an electromagnetic signal having a preselected frequency up to 10 KHz and indicative of a first point located on the first side of the structural component at a predetermined spacial relationship to said transmitter housing;

(c) a receiver housing for enclosing a signal receiving means;

(d) a signal receiving means mounted in said receiver housing for generating an electrical signal proportionate to the strength of the electromagnetic signal received from the transmitting means at a receiver-corresponding position located at a predetermined spacial relationship to the receiver housing which corresponds to a position located on the second side of the structural component;

(e) display means for displaying a maximum-indicative reading when said electrical signal generated by said signal receiving means indicates a maximum electromagnetic signal level, such that said maximum-indicative reading is displayed at said display means when the receiver housing is located such that the receiver-corresponding location corresponds to the second point to be located; and (f) electrical interconnecting means for electrically interconnecting the electrical signal generated by the signal receiving means to the display means comprising a cord insertable into the receiver housing and electrically connectable to the display means and signal receiving means, said cord having a first interconnection means for supplying power to the display means from a power source located in the receiver housing, and a second interconnection means for supplying power received at a display means from the first interconnection means to the signal receiving means, such that power is supplied to the signal receiving means and the display means when the cord is inserted into the receiver housing and electrically connected to the receiving means and display means.

* * * * *

UNITED STATES PATENT AND TRADEMARK OFFICE
CERTIFICATE OF CORRECTION

PATENT NO. : 4,998,058
DATED : Mar. 5, 1991
INVENTOR(S) : Tofte et al.

It is certified that error appears in the above-identified patent and that said Letters Patent is hereby corrected as shown below:

In column 2, line 33 after "taped" delete --,--.

In column 3, line 58 "features" should read --feature--.

In column 5, line 20 after the word "circuit" delete "-".

In column 7:
    line 14, after the numeral "12" delete --,-- ;
    line 54, after the numeral "42" insert --'-- ;
    line 54, after the numeral "42" delete --,--.

In column 8:
    line 3, between "reverse" and "biased" insert "-".
    line 62, between "forward" and "biased" insert "-".

In column 11, line 42, "KHZ" should be --kHz--.

In column 9, line 22, "a stable" should read --astable--.

Signed and Sealed this

Third Day of November, 1992

Attest:

DOUGLAS B. COMER

Attesting Officer      Acting Commissioner of Patents and Trademarks